3,308,677
TRANSMISSION CONTROL SYSTEM
Henri J. Van Lent, Warren, and Raymond P. Michnay, Rochester, Mich., assignors to General Motors Corporation, Detroit, Mich., a corporation of Delaware
Filed Jan. 25, 1965, Ser. No. 427,706
11 Claims. (Cl. 74—472)

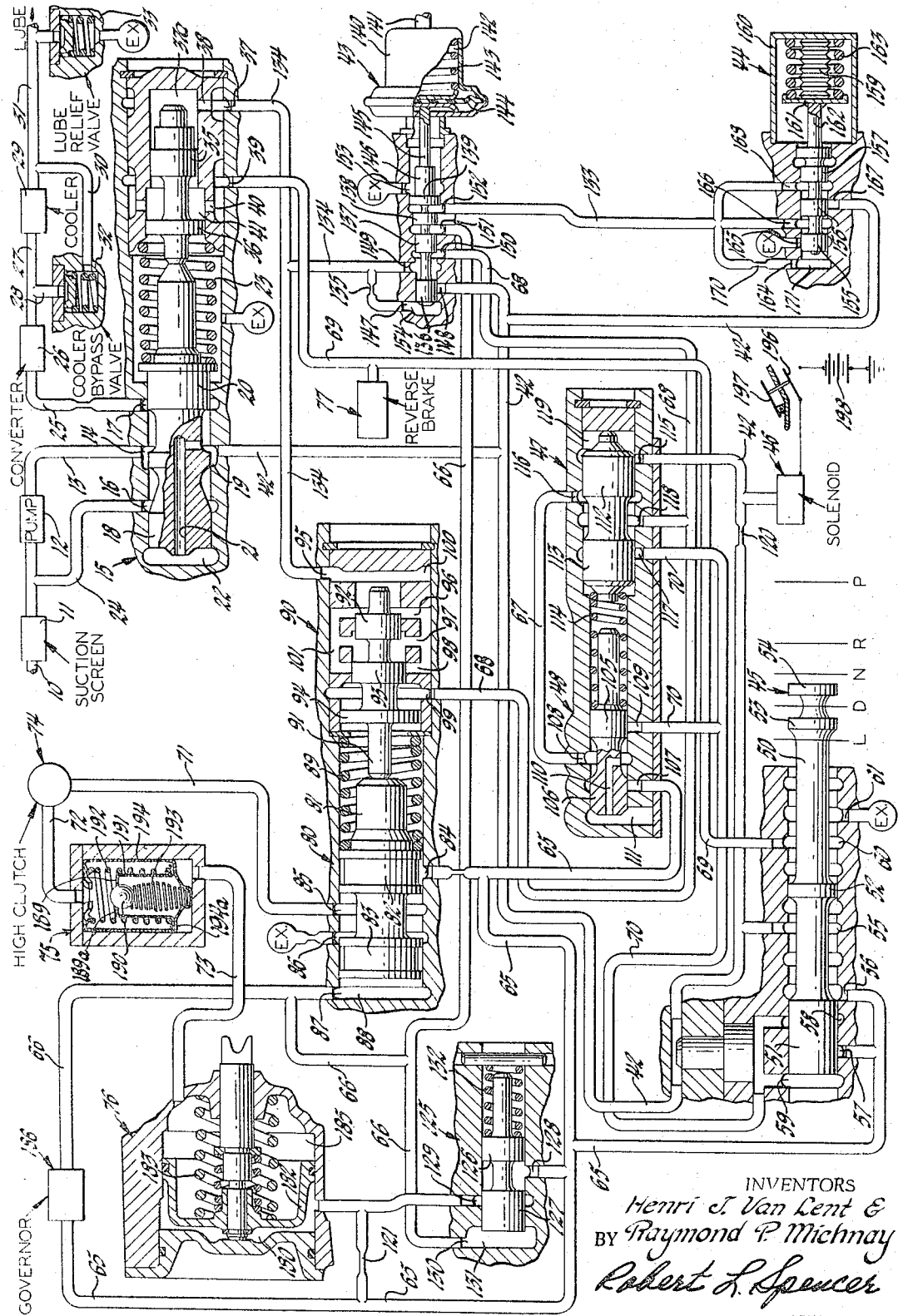

This invention relates to control systems for automatic transmissions, and more particularly to an improved control system for a vehicle transmission of the type incorporating a direct drive clutch actuation servo and a brake servo for establishing change of drive ratio. Such transmissions are well known in the art as exemplified by the patent to Oliver K. Kelley and Robert S. Plexico, 2,865,227, issued Dec. 23, 1958. In view of the state of the art, it is not believed necessary to illustrate the gearing, and the servos are illustrated schematically herein.

An object of this invention is to provide an improved transmission control system incorporating an engine vacuum controlled pressure modulator valve for regulating pressure delivered to a line pressure regulator valve and a shift valve, for controlling line pressure regulation and timing of shift of drive ratio.

Another object of this invention is to provide an altitude compensator valve for delivering variable hydraulic pressure to the vacuum controlled modulator valve for compensating for variations of absolute atmospheric pressure whereby the pressure regulation of the modulator valve will be affected by changes in altitude only to a desired degree.

A further object of this invention is to provide an altitude compensator valve constructed and arranged to automatically cut off its pressure signal to the modulator valve in the event of failure of the atmospheric pressure responsive element of the altitude compensator valve.

An additional object of this invention is to provide a modulator valve controlled by engine manifold vacuum and vehicle speed and also normally controlled by an altitude compensator valve.

A specific object of this invention is to provide in a control system for a transmission, a modulator valve and altitude compensator valve as described and including a detent pressure regulating valve normally blocked off from the altitude compensator valve and effective under downshift detent condition of operation to deliver pressure to a shift valve for downshifting the shift valve and for delivering pressure to the modulator valve such that the pressure delivered by the modulator valve may vary between line pressure and detent pressure, but may never be less than detent pressure.

These and other objects and advantages of this invention will be apparent from the following drawing and specification in which:

The sole figure is a schematic drawing of a control system incorporating the principles of this invention.

Referring to the single figure, there is shown a control system for a hydraulically controlled transmission incorporating the principles of this invention, and including a low gear brake servo 76, a direct drive clutch servo 74 and a reverse brake servo 77 adapted to be selectively actuated to provide low gear drive, direct drive, and reverse.

As shown, an engine driven pump 12 draws oil from a sump (not shown) through a suction passage 10 and a suitable screen 11 and delivers oil under pressure through a passage 13 to a port 14 of a line pressure regulator valve indicated generally at 15. Valve 15 includes ports 14, 16 and 17 adapted to be controlled by spaced lands 18, 19 and 20. A passage 21 in valve 15 connects the space between lands 19 and 20 to a chamber 22 at one end of land 18. A spring 23 biases valve 15 toward the left as viewed in the figure towards a position wherein port 14 is connected to port 17. A passage 24 connects port 16 to passage 10. A converter pressure supply passage 25 connects port 17 to the transmission converter 26. Oil is permitted to pass through converter 26 to an oil cooler 29 through a converter oil discharge passage 27. Oil leaving cooler 29 is delivered to the transmission for lubrication purposes through a lubrication pressure supply passage 31. An oil cooler by-pass valve 32 may permit oil to by-pass cooler 29 when cooling is not required by way of passages 28 and 30. A lubrication pressure relief valve 33 regulates the pressure in lubrication pressure supply passage 31.

As will readily be understood, line pressure in chamber 22 will tend to force valve 15 to the right, as viewed in the figure, against the action of spring 23 to a position wherein land 19 may momentarily connect port 14 to port 16 to dump excess pressure to passage 24.

Additional control of pressure delivered by valve 15 is by means of a line pressure modulator plug having lands 35 and 36, the land 36 being of greater diameter than land 35. As shown, a chamber 37A at one end of land 35 may receive modulator pressure from a passage 134 through ports 37 and 38. An additional chamber 41 between lands 35 and 36 may receive pressure through ports 39 and 40 under control of a drive range selector valve 45 when operating in reverse as hereafter explained.

A line pressure delivery passage 42 connected to port 14 of line pressure regulator valve 15 delivers line pressure controlled by valve 15 to a port 148 of a modulator valve 43, to a port 167 of an altitude compensator valve 44, to a port 55 of a drive range selector valve 45, to a solenoid valve 46 and to a port 115 of a detent valve 47.

A transmission with which the improved control system of the present invention may be employed is fully described in the United States Patent 2,865,227 to Oliver K. Kelley and Robert S. Plexico. Accordingly, the details of the torque converter and planetary gearing and servos are not disclosed in this application. In general, the transmission consists of a hydraulic torque converter adapted to drive a vehicle load shaft through a two speed planetary step ratio gearing. Low gear drive is accomplished by applying a brake servo 76. Direct drive is accomplished by applying a direct drive clutch servo 74. When pressure is delivered to clutch servo 74, it passes through servo 74 to a release chamber 185 of servo 76 to release the brake. Reverse is accomplished by applying a reverse servo 77.

Drive range selector valve 45 includes a movable valve member 50 adapted to be positioned to select low range forward, drive range forward, neutral and reverse conditions of operation. Valve member 50 is provided with three lands 51, 52, 53 for controlling fluid flow and a fourth land 54 spaced from land 53. A valve operating linkage (not shown) is adapted to have a pin (not shown) disposed in the space between lands 53 and 54 for moving the valve in response to actuation of the linkage. Seven ports 55, 56, 57, 58, 59, 60 and 61 are associated with the valve 45. Port 55 connects to line pressure supply passage 42. Ports 56 and 57 connect to a drive pressure delivery passage 65. Ports 58 and 59 connect to a passage 70. Port 60 connects to a reverse pressure supply passage 69, and port 61 connects to exhaust.

Drive pressure supply passage 65, controlled by drive range selector valve 45, connects to ports 128 and 129 of a high speed downshift timing valve 125, to a brake apply chamber 180 at one side of a piston 182 of a brake band servo 76, delivers line pressure to a vehicle speed responsive governor 186, to a port 84 of a shift valve 80, and to a port 107 of a detent pressure regulator valve 48.

Governor 186, which may be of a conventional type well known in the art, is driven by the transmission power delivery shaft and delivers pressure which increases with increase of vehicle speed to a governor pressure delivery passage 66. Governor pressure is delivered by passage 66 to a port 130 of high speed downshift timing valve 125, to a port 87 of a shift valve 80, and to a port 151 of a modulator valve 43.

Shift valve

A shift valve indicated generally at 80 controls shift of transmission drive ratio between reduction and direct drive. Shift valve 80 includes a valve member 81 having spaced lands 82 and 83 thereon. Four ports 84, 85, 86 and 87 are associated with the valve. Port 84 connects to drive range pressure supply passage 65. Port 85 connects to a clutch feed passage 71. Port 86 is an exhaust port. Port 87 admits pressure from governor pressure delivery passage 66 to a chamber 88 at one end of land 83. A spring 89 biases valve 80 to the left as viewed in the figure against the action of governor pressure in chamber 88, toward the downshift position of the valve.

A shift valve regulator plug indicated generally at 90 carries a stem 91 adapted to contact the end of valve member 81 and is provided with three lands 92, 93 and 94. Land 93 is of greater diameter than land 92 and land 94 is of a greater diameter than land 93. Five ports 95, 96, 97, 98, 99 are associated with regulator plug 90. Port 95 admits modulator valve pressure from a modulator pressure delivery passage 134 to a chamber 100 at the end of land 92. Port 96 may admit pressure from chamber 100 to ports 97 and 98 through a passage 101, depending upon the position of plug 90 in the casing. Port 99 may be connected to port 98 depending upon the position of plug 90 in the casing. Modulator pressure tends to position shift valve 80 in its downshift position. Lands 93 and 92, being of different areas, provide a hysteresis effect to prevent valve "hunting."

Detent valve

A detent valve assembly includes a detent valve indicated generally at 47 and a detent pressure regulator valve indicated generally at 48. Pressure regulator valve 48 is provided with spaced lands 105, 106 and ports 107, 108, 109. A passage 110 connects the space between lands 105 and 106 to a chamber 111 at the end of land 106. Port 107 connects to drive pressure supply passage 65. Port 108 connects to a delivery passage 67. Port 109 connects to a passage 70 controlled by drive range selector valve 45. Valve 48 is effective to maintain a pressure in passage 67 which is maintained at a fixed pressure differential, for example, thirty pounds less than line pressure.

Detent valve 47 includes spaced lands 112 and 113 and ports 115, 116, 117 and 118. A spring 114 seats on land 113 and land 105 of regulator valve 48 to bias the valves 47 and 48 in opposite directions. Port 116 connects to passage 67. Port 118 connects to a detent valve pressure delivery passage 68. Port 117 connects to a passage 70, and port 115 connects line pressure supply passage 42 to a chamber 119 at one end of land 112. Line pressure in chamber 119 is normally effective in drive range operation to position detent valve land 112 to block off port 116, and land 113 is normally positioned to connect port 118 to port 117. Passage 68 is thereby normally connected to exhaust through passage 70 and port 59 of selector valve 45 when the drive range selector valve is positioned for drive range operation.

High speed downshift timing valve

A high speed downshift timing valve 125 includes a movable valve member provided with spaced lands 126 and 127 for controlling flow of fluid from a port 128 to a port 129. A spring 132 yieldably biases the valve to a position wherein port 128 is connected to port 129. A port 130 admits governor pressure from passage 66 to a control chamber 131 at the end of land 127. Upon a rise of governor pressure to a predetermined pressure, the valve will move against spring 132 to a position wherein port 128 is blocked off from port 129 by land 127. The valve is calibrated to move to its cut off position at some predetermined vehicle speed, for example, thirty miles per hour.

At speeds below a predetermined vehicle speed, with ports 128 and 129 connected, a restriction 121 in passsage 65 is by-passed. At speeds above such predetermined speed, with ports 128, 129 blocked off by land 127, restriction 121 in passage 65 is rendered effective. Restriction 121, at speeds above such predetermined vehicle speed, is effective to delay release of brake servo 76 on a high speed downshift from high to reduction drive.

Modulator valve

A modulator valve 43 is provided to deliver variable control pressure to a modulator pressure delivery passage 134. Valve 43 includes a movable valve member having four spaced lands 136, 137, 138 and 139. Lands 136 and 137 are of equal diameter. Land 138 is of greater diameter than lands 136 and 137, and land 139 is of greater diameter than land 138. A housing 140 encloses a chamber 142 adapted to be connected to an engine intake manifold (not shown) of an internal combustion engine (not shown) by a passage 141. A diaphragm 144 extends across chamber 142, and is biased toward the left as viewed in the figure in opposition to the effect of vacuum in chamber 142 by a spring 143. A stem 145 transmits force from diaphragm 144 to one end of the movable valve member 146. Seven ports 147, 148, 149, 150, 151, 152 and 153 are associated with movable valve member 146. Port 147 admits modulator valve delivered pressure from passage 134 to a chamber 154 at the end of land 136 through a restriction 135. Port 148 connects to line pressure supply passage 42. Port 149 delivers modulator pressure to passage 134. Port 150 connects to passage 68. Port 151 admits governor pressure to the space between lands 137 and 138 from passage 66. Port 152 admits pressure from altitude compensator valve delivery passage 133 to the space between lands 138 and 139, and port 153 connects to exhaust. Modulator valve 43 delivers variable controlled pressure to passage 134 for controlling the line pressure regulator valve and shift valve as hereafter described.

Altitude compensator valve

Altitude compensator valve 44 includes a movable valve member having spaced lands 155, 156, 157 of equal diameter. An evacuated bellows 159 has one end thereof fixed to a housing 160 and a movable end fixed to a spring seat 161. A stem 162 on the movable valve contacts spring seat 161. A spring 163 seated upon housing 160 and spring seat 161 biases the movable valve toward the left in opposition to the force effect of the evacuated bellows 159 which tends to move the spring seat 161 toward the right as viewed in the figure and in opposition to the power effect of the spring. Five ports 164, 165, 166, 167 and 168 are associated with the movable valve member. Port 164 connects a chamber 171 to passage 133 on the downstream side of a restriction 170. Port 165 is an exhaust port. Ports 166 and 168 connect to delivery passage 133. Port 167 connects to line pressure supply passage 42. Valve 44 is effective to deliver variable pressure to passage 133, the pressure normally being varied in response to changes of absolute atmospheric pressure in order to compensate for the effect of altitude changes upon modulator valve 43, due to loss of available manifold vacuum effective in chamber 142 with increase in altitude.

Band servo timing valve

A valve indicated generally at 75 which may be termed a band servo timing valve or coast downshift timing valve is located in the hydraulic circuit between the direct drive clutch 74 and the band release chamber 185 of brake servo 76.

A ball 190 is yieldably biased into contact with a valve seat 189 on a sleeve 191 by a relatively light spring 193. A small orifice 189a is provided through valve seat 189. Sleeve 191 is biased into contact with a seat 194a formed on a housing 194 by means of a relatively heavy spring 192.

In operation, considering an upshift from reduction to direct drive, direct drive clutch 74 will be engaged and brake servo 76 released. Fluid pressure is directed through passage 71 to engage clutch 74 and flows through passage 72 to timing valve 75. Pressure in passage 72 immediately moves ball 190 off of seat 189 to permit fluid flow to band release chamber 185 through passage 73. Thus the clutch pressure effectively by-passes valve 75 without restriction to provide rapid release of the brake servo during upshift to direct drive.

Considering the operation upon accomplishing a coast downshift with the engine power off, passages 71, 72 are being exhausted through ports 85, 86 of the shift valve. Ball valve 190 will seat on seat 189 to render orifice 189a effective so that pressure in passages 72 and 71 will exhaust at a more rapid rate than pressure in passage 73. The restriction 189a delays the application of the low band by servo 76 until the clutch is fully released to assure a smooth downshift from direct to reduction drive.

Considering a forced downshift which may occur with the engine power on, the line pressure will be relatively high at wide open or advanced throttle. In this circumstance a higher differential pressure will exist between passages 73 and 72 sufficient to cause sleeve 191 to be moved off spring seat 194a against the action of relatively heavy spring 192. This permits band release chamber 185 and passage 73 to be exhausted more rapidly than at closed throttle operation to prevent more rapid band application. In this manner any neutral dwell as may occur in closed throttle or normal overrun downshift is prevented. The brake is applied rapidly to prevent any engine run-away upon release of the clutch during forced downshifts.

Operation of modulator valve

Modulator valve 43 is controlled by engine intake manifold vacuum, by governor pressure, and by compensator pressure to deliver modulator valve pressure to passage 134. Spring 143 applies a force to diaphragm 144 tending to move the diaphragm 144, stem 145 and the movable valve to the left, as viewed in the figure. Assuming a momentary constant vehicle speed, engine vacuum and altitude, controlled pressure less than line pressure will be maintained in passage 134. Oil will be permitted from line pressure supply passage 42, through ports 148 and 149 to passage 134. This pressure will be admitted through restriction 135 and port 147 to chamber 154 at the end of land 136. Pressure in chamber 154 will force the valve to the right as viewed in the figure against the action of spring 143 to cause land 136 to block off port 148 and to connect port 149 to port 150. Passages 68 and 70 serve to exhaust for excess pressure, the exhaust being through ports 118, 117 of detent valve 47, passage 70 and port 59 of manual valve 45 when operating in drive range non-detent operation. Thus, a pressure less than line pressure will be delivered to passage 134.

As will be understood, governor pressure from passage 66 is supplied through port 151 to the space between lands 137 and 138. Since land 138 is of greater diameter than land 137, governor pressure will exert a net thrust on the valve member acting in assistance to modulator pressure in chamber 154 and tending to move the modulator valve against the action of spring 143 to reduce the pressure maintained in passage 134. Governor pressure is utilized to reduce the modulator pressure in passage 134 in response to increase in vehicle speed. As is will known, engine manifold vacuum is maximum with a closed engine throttle and decreases in response to engine throttle opening. Thus, with the engine idling at closed throttle and with the vehicle standing still, modulator pressure delivered to passage 134 by modulator valve 43 will be minimum. If we assume the vehicle is starting from a standing start with the engine carburetor throttle fully opened, modulator pressure in passage 134 will be maximum. Due to loss of vacuum acting on diaphragm 144, spring 143 will move the valve to a position to maintain a relatively high modulator pressure in passage 134. As the vehicle speed increases, governor pressure will become increasingly effective to oppose the force of spring 143 to move the valve against the spring to progressively decrease the pressure maintained in passage 134. Thus, the modulator pressure maintained in passage 134 is a function of engine manifold vacuum and vehicle speed, and decreases with increase in vehicle speed and with increase in manifold vacuum effective upon diaphragm 144. There is thus provided a single spring force tending to increase modulator pressure and two hydraulic pressures and manifold vacuum opposing the force effect of spring 143. Pressure in chamber 154, governor pressure and manifold vacuum each oppose spring 143 and tend to reduce the pressure maintained in passage 134. A further hydraulic force is applied to land 139 through passage 133 as hereafter explained.

Operation of altitude compensating valve

As is well known, automotive vehicles are commonly operated through a wide range of land elevations which may vary from sea level to mountain tops. Due to the rarified atmosphere at high elevations, internal combustion engines are unable to develop full engine torque at such high elevations. Accordingly, it is desirable that the modulator valve 43 deliver a modulator pressure to passage 134 which is reflective not only of the torque load on the engine and vehicle speed, but also of changes in altitude.

It will be understood that since volumetric efficiency of the engine decreases with a decrease in atmospheric pressure (and available engine manifold vacuum) with a consequent decrease in available engine torque at any given engine r.p.m., it is desirable that the modulator valve 43 deliver a lesser control pressure for an increase in altitude. However, the decrease in available engine torque and decrease in modulator pressure in passage 134 are not at the same rate, so that the net result of employing the modulator valve 43 and altitude compensator valve 44 is that the modulator pressure delivered to passage 134 is a compromise pressure determined by the action of the two valves. Modulator pressure in passage 134 is used to control the shift point of the transmission. The shift point is normally controlled to occur at the peak torque speed of the engine for smoothness of shift. In the absence of altitude compensation, the shift point would occur at the same point despite a reduction in available torque. As a result, in the absence of altitude compensation, the shifts become increasingly rough with increase in altitude. The altitude compensator smooths up the shifts by regulating the modulator valve to decrease the modulator valve pressure in passage 134 with decrease in atmospheric pressure and to permit modulator valve pressure to increase with increase in atmospheric pressure.

Evacuated bellows 159 has one end grounded to housing 160. A spring 163 tends to separate the bellows. With increase in altitude, the bellows are spread apart by spring 163, the spring exerting increased effective force upon valve stem 162. At low altitudes, valve 44 will deliver minimum compensator pressure to passage 133. Pressure is conducted from passage 42 to passage 133 through ports 167 and 168. Pressure delivered to chamber 171 through restriction 170 acts on land 155 tending to move the valve from a position wherein ports 167 and 168 are connected to a position wherein land 156 blocks off port 167 from port 168 and land 155 uncovers exhaust port 165. With the effective force of spring 163 at minimum as at low altitudes, the pressure in compensator pressure delivery passage 133 is minimum. With increase in effective spring force as controlled by bellows 159, the pressure in passage 133 will increase. This pressure acting upon the differential area of lands 138 and 139 of modulator valve 43 provides a thrust to the modulator valve which increases with increase in altitude which reduces the pressure delivered to passage 134 by valve 43 and compensates or partially compensates for the loss of available vacuum in the engine manifold due to increased altitude. The relationship between the bellows area and the area of chamber 171 is set so that the compensating valve 44 keeps regulating at less than 32 inches of mercury absolute in order to make the valve 44 a self-cleaning valve. The pressure delivered through passage 133 provides an added force tending to oppose spring 143 which drops the modulator pressure in passage 134 by an amount determined by the absolute atmospheric pressure.

An important feature of this arrangement is the fail-safe feature whereby in the event of failure of bellows 159, passage 133 is connected to exhaust. Upon failure of bellows 159 for any reason, spring 163 will position the compensator valve to block off port 167 and connect port 166 to exhaust port 165. Land 157 will block off port 168 from port 167, while land 155 will permit exhaust of fluid from passage 133 by way of port 166 and exhaust port 165. Thus, leakage of fluid into bellows 159 will simply result in the conversion of the system to a simple vacuum modulator system without altitude compensation. Modulator valve 43 will thereupon maintain adequate pressure in passage 134 to control the line pressure regulator valve to maintain adequate line pressure in passage 42 to prevent clutch burn and failure as might otherwise occur. The provision of the altitude compensator as a separate unit from the modulator valve is of further advantage due to its greater flexibility for calibration and location in the system. It is compact, cheap, can be easily calibrated, can be located anywhere in the system, and provides the fail-safe function whereby in the event of bellows failure, the modulator valve is permitted to function in the normal manner of a modulator valve not provided with altitude compensation.

*Detent valve operation*

A downshift detent valve 47 is provided for accomplishing a full throttle forced downshift of the transmission herein termed a detent downshift as distinguished from a normal part throttle forced downshift which may also be had at throttle positions up to full carburetor throttle opening. Two valves, detent valve 47 and a detent regulator valve 48 are disposed in alignment in the valve bore. Detent valve control chamber 119 is normally supplied with line pressure from line pressure supply passage 42 through port 115. Pressure in chamber 119 forces detent valve 47 to the left against the spring 114 to a position wherein land 112 blocks off port 116 and wherein port 118 is connected to port 117. Passage 68 will thereby normally be connected to exhaust through passage 70 and port 59 of drive range selector valve 45, assuming the valve 45 to be placed for drive range operation. A solenoid valve 46 is provided to control pressure in chamber 119. Valve 46 is of the type adapted to connect chamber 119 to exhaust or to block off chamber 119 from exhaust. When energized, solenoid valve 46 dumps pressure from chamber 119 and pressure on the downstream side of a restriction 120 in passage 42 to exhaust. When deenergized, valve 46 blocks off its exhaust port (not shown) so that line pressure will be maintained in chamber 119. Solenoid valve 46 is controlled by a switch 196 controlled by accelerator pedal 197. When the accelerator pedal is moved to the full open position for the engine carburetor throttle valve, switch 196 will be closed to energize solenoid valve 46 from battery 198. At all other times switch 196 will be open.

With pressure in chamber 119 of detent valve 47, pressure regulator valve 48 will deliver a regulated pressure less than line pressure to passage 67. Drive pressure from passage 65 will enter chamber 111 through passage 110, moving detent regulator valve against spring 114 to regulate pressure in passage 67 to a predetermined pressure less than drive pressure. Exhaust of excess pressure is through port 109 and passage 70. With the drive range selector valve in drive range position, pressure in passage 67 is blocked off by land 112 of detent valve 47 and is of no effect unless solenoid valve 46 is energized.

Assuming the accelerator pedal is moved for detent operation, solenoid valve 46 will dump pressure from chamber 119 of detent valve 47. Restriction 120 will prevent loss of pressure in passage 42 on the upstream side of the restriction 120. Spring 114 will move detent valve 47 to the right to a position wherein port 117 is blocked off by land 113 and port 116 will be connected to port 118 to permit regulated pressure from detent regulator valve 48 and passage 67 to enter passage 68. This regulated pressure will thereupon be delivered to land 94 of shift valve regulator plug 90 to apply a hydraulic force to plug 90 acting in assistance to modulator pressure acting upon lands 92 and 93 to oppose the effect of governor pressure in chamber 88. It will be understood that under detent conditions of operation shift valve 80 will be moved to its downshift position at higher vehicle speeds than is true when operating at full throttle position.

Regulated pressure from regulator valve 48 and passage 47 is directed through ports 116 and 118 to passage 68. Land 113 blocks off port 117 to prevent loss of regulated pressure as would otherwise occur through ports 118, 117 and passage 70.

In drive range detent operation, line pressure is supplied to port 148 of modulator valve 43 and detent pressure less than line pressure is delivered to port 150 through passage 68. It will be apparent that the modulator pressure in passage 134 may vary between the value of line pressure and that of regulated detent pressure in passage 68 but may never be less than the regulated detent pressure in passage 68. Thus the modulator pressure in passage 134 may be higher than the regulated detent pressure in passage 68, but never less than the regulated detent pressure when operating in detent operation. When operating in drive range normal non-detent operation the modulator pressure in passage 134 may be of a lower value than the regulated detent pressure in passage 67, depending upon the operation of valve 43.

At relatively low altitude such as sea level, modulator pressure in passage 134 may vary between line pressure and detent regulator pressure, and may, for example, be 30 pounds less than line, or some value between line and 30 pounds less than line. At high altitudes the main line pressure is minimum and the regulated detent pressure will be main line or slightly less than main line pressure. The modulator pressure will be at least as great as regulated detent pressure. This boosts the main line pressure delivered to passage 42 by line pressure regulator valve 15. This is desirable to assure adequate capacity of the brake servo to prevent brake slippage under maximum torque conditions of operation.

The modulator valve pressure, which must be equal to or greater than regulated detent pressure is effective upon lands 92 and 93 of shift valve regulator plug 90 to assist the regulated detent pressure acting upon land 94 to move the shift valve to its downshift position against the effect of governor pressure in chamber 88 of shift valve 80. In addition, the increased modulator pressure which can never be less than regulated detent pressure delivered to chamber 37a of the line pressure regulator valve, acts upon land 35 of the line pressure regulator plug to cause the line pressure regulator valve to boost the line pressure.

Neutral operation

With drive range selector valve 45 positioned for neutral operation, drive pressure supply passage 65 is connected to exhaust through port 57 and the end of the valve bore. Land 51 blocks off port 56 from port 55 so no fluid under pressure may enter passage 65 from passage 42. Reverse pressure supply passage 69 is blocked off from port 55 by land 52 and is connected to exhaust through port 60 and through the opposite end of the valve bore. Since no pressure is delivered to brake servo 76, clutch servo 74, or reverse brake servo 77, no power can be transmitted through the transmission and the transmission is in neutral.

Drive range operation

With the drive range selector valve moved to its drive range position, the transmission will be conditioned for a normal standing start in low gear or reduction drive. Pressure from line pressure supply passage 42 is delivered to drive pressure passage 65 by way of ports 55 and 56 of drive range selector valve 45. Ports 57 and 58 are blocked off by land 51. Port 59 connects to exhaust.

Drive oil is delivered through passage 65 to governor 186, to port 128 of high speed timing valve 125, to pressure supply port 84 of shift valve 80, and to pressure supply port 107 of detent pressure regulator valve 48. Governor 186 delivers variable pressure which increases with vehicle speed through passage 66 to chamber 88 of shift valve 80, to chamber 131 of high speed timing valve 125, and to port 151 of modulator valve 43. At low vehicle speeds, spring 89 and modulator pressure from passage 134 will be effective to position shift valve 80 in its downshift position shown irrespective of the effect of governor pressure in chamber 88. Passage 71 is connected to exhaust through ports 85, 86 to release clutch 74. High speed timing valve 125 will be placed in its left-hand position by spring 132 to connect port 128 to port 129 irrespective of governor pressure in chamber 131. Drive oil will be supplied to brake servo apply chamber 180 directly through ports 128, 129 of valve 125 so that restriction 121 is by-passed and of no effect. With pressure in chamber 180 of brake servo 76, the transmission reduction drive brake (not shown) is engaged to condition the transmission for reduction drive, forward operation. Piston 182 will be moved against brake release spring 183 to apply the low gear reaction brake (not shown) of the transmission.

Upon acceleration of the vehicle in low gear, governor pressure will increase with increase in vehicle speed to a value where, at some vehicle speed, governor pressure will overcome the effect of modulator pressure acting on regulator plug 90 and the shift valve will move to its upshift position wherein port 84 is connected to port 85. Drive pressure thus admitted to passage 71 will cause engagement of a direct drive clutch by servo 74. This pressure will also be directed through passage 72, valve 75 and passage 73 to brake release chamber 185. With pressure in both chambers 180 and 185, spring 183 will move piston 182 to release the brake.

Considering a downshift from direct drive to reduction drive, if modulator pressure in chamber 100 plus spring 89 are effective to overcome the effect of governor pressure in chamber 88, valve 80 will move to its downshift position wherein passage 71 is connected to exhaust through ports 85 and 86. Pressure in chamber 180 is effective to reapply the brake. At speeds below a predetermined vehicle speed, for example, thirty miles per hour, valve 125 will be positioned to connect port 128 to port 129 to by-pass restriction 121. At speeds above such predetermined vehicle speed, governor pressure will position valve 25 to block off port 129 from port 128 to render restriction 121 effective. Restriction 121, when effective, delays application of servo 76. When restriction 121 is by-passed, servo 76 engages the transmission reaction brake more quickly.

A drive range detent or past-full throttle forced downshift may be had by moving accelerator pedal 197 to close switch 196. As explained, pressure is exhausted from detent valve control chamber 119 by solenoid valve 46 when switch 196 is closed. Detent regulator valve pressure from passage 67 is delivered through ports 116, 118 of detent valve 47 to passage 68 and to port 99 of shift valve regulator plug 90 and to port 150 of modulator valve 43. Pressure acting on land 94 assists modulator pressure to force shift valve 80 to its downshift position.

As heretofore explained, altitude compensator valve 44, in drive range operation, normally delivers a pressure to passage 133 which acts on land 139 of modulator valve 43 tending to decrease the modulator pressure delivered to passage 134 by the modulator valve. Pressure delivered by compensator valve 44 is minimum at low altitude and increases with increase in altitude.

Low range operation

With drive range selector valve 45 positioned for low range operation, land 51 will block off port 59 and port 55 will be connected to ports 56 and 58. Brake servo 76 will be supplied with pressure through passage 65 and line pressure will be admitted through port 58 to passage 70. Pressure in passage 70 will render detent regulator valve 48 incapable of regulating pressure such that pressure delivered to passage 67 will become line pressure. In addition, line pressure will be conducted through ports 117, 118 of valve 47 to passage 68 to port 150 of modulator valve 43. Pressure delivered by modulator valve 43 will no longer be a modulated pressure but will be line pressure. This line pressure delivered by valve 43 to passage 134 will cause the line pressure regulator valve 15 to boost line pressure, and the boosted pressure in chamber 100 of the shift valve regulator plug 90 will retain the shift valve in its downshift position. Altitude compensator valve 44 will be unable to effect the operation of modulator valve 43, since valve 43, in low range operation, has no exhaust port for exhausting excess pressure. Valve 43 no longer regulates pressure in passage 134, this pressure now being full line pressure. Line pressure from passage 68 is also admitted through port 99 of shift valve regulator plug 90 and acts on land 94 to assist in maintaining shift valve 80 in its downshift position.

Reverse operation

With drive range selector valve positioned for reverse operation, land 51 blocks off line pressure supply passage 42 from drive passage 65 and from passage 70. Passage 65 is exhausted through port 57 and passage 70 is exhausted through port 59. Valve 45 connects ports 55 and 60 to admit line pressure to a reverse brake apply passage 69 to engage a reverse brake servo 77. Reverse pressure in passage 69 is also admitted to chamber 41 of the line pressure regulator plug and acts on land 36 to cause the line pressure regulator valve to boost the line pressure. With the reverse brake servo engaged, the transmission will drive in reverse.

We claim:

1. In a transmission for an engine driven vehicle of the type having an engine intake manifold and having fluid pressure responsive transmission servos for establishing different transmission drive ratios, a fluid pressure source, means for controlling the transmission drive ratio including a shift valve effective in a downshift position to establish a first drive ratio and movable to an upshift position to establish a second drive ratio, means for biasing said shift valve from said downshift to said upshift position comprising a vehicle speed responsive governor, a modulator valve for delivering variable pressure to said shift valve tending to bias said shift valve from said upshift to said downshift position, said modulator valve being responsive to engine manifold vacuum to vary the pressure delivered thereby, and an altitude compensator valve for delivering a control pressure to said modulator valve, the pressure delivered by said compensator valve being varied in response to changes in absolute atmospheric pressure to compensate for changes in engine manifold vacuum due to changes of absolute atmospheric pressure.

2. In a transmission for an engine driven vehicle of the type having an engine intake manifold and having fluid pressure responsive transmission servos for establishing different transmission drive ratios, a fluid pressure source, means for controlling the transmission drive ratio including a shift valve connected to said source effective in a downshift position to condition said servos to establish reduction drive and effective in an upshift position to condition said servos to establish direct drive in said transmission, means for controlling the position of said shift valve including a vehicle speed responsive governor supplied with pressure from said source and effective to deliver variable pressure to said shift valve tending to move said shift valve from said downshift to said upshift position, said last-mentioned means also including a pressure modulator valve connected to said source and adapted to deliver variable pressure to said shift valve tending to move said shaft valve from said upshift to said downshift position, means for controlling the modulator valve including means responsive to engine intake manifold vacuum, and an altitude compensator valve connected to said source and adapted to deliver variable pressure to said modulator valve, the pressure delivered by said altitude compensator valve being varied with changes in absolute atmospheric pressure and effective upon said modulator valve to compensate for variation of available manifold vacuum resulting from changes in altitude.

3. In a transmission for an engine driven vehicle of the type having an engine intake manifold and having fluid pressure responsive transmission servos for establishing different transmission drive ratios, a fluid pressure source, means for controlling the transmission drive ratio including a shift valve connected to said source effective in a downshift position to condition said servos to establish reduction drive and effective in an upshift position to condition said servos to establish direct drive in said transmission, means for controlling the position of said shift valve including a vehicle speed responsive governor supplied with pressure from said source and effective to deliver variable pressure to said shift valve tending to move said shift valve from said downshift to said upshift position, said last-mentioned means also including a pressure modulator valve connected to said source and adapted to deliver variable pressure to said shift valve tending to move said shift valve from said upshift to said downshift position, means for controlling the modulator valve including means responsive to engine intake manifold vacuum, and an altitude compensator valve connected to said source and adapted to deliver variable pressure to said modulator valve, the pressure delivered by said altitude compensator valve being varied with changes in absolute atmospheric pressure and effective upon said modulator valve to compensate for variation of available manifold vacuum resulting from changes in altitude, said compensator valve including an evacuated expandable chamber and a spring, said spring being effective upon loss of vacuum in said chamber to automatically position said altitude compensator valve to reduce the pressure delivered by said compensator valve to zero.

4. In a transmission control system for an engine driven vehicle of the type having an engine intake manifold and having fluid pressure responsive transmission servos for establishing different transmission drive ratios, a fluid pressure source, means for controlling the transmission drive ratio including a shift valve connected to said source effective in a downshift position to establish a first transmission drive ratio and movable to an upshift position to establish a second transmission drive ratio, means for controlling the position of said shift valve including a vehicle speed responsive governor connected to said source and adapted to deliver variable governor pressure to said shift valve tending to move said shift valve to its upshift position, said last-mentioned means also including a modulator valve connected to said source and adapted to deliver variable pressure to said shift valve tending to move said shift valve from said upshift to said downshift position, means for controlling said modulator valve including a spring and vacuum responsive means connected to said engine intake manifold, additional means for controlling said modulator valve comprising an altitude compensator valve connected to said source and adapted to deliver variable pressure to said modulator valve, means for controlling said altitude compensator valve including a spring biasing said valve toward a position to increase the compensator pressure in response to drop of absolute atmospheric pressure, an evacuated expandable chamber normally effective to control the effective force of said spring, said spring being effective upon loss of vacuum in said chamber to position said compensator valve to reduce the pressure delivered by said compensator valve to zero.

5. In a transmission control system for an engine driven vehicle of the type having an engine intake manifold and having fluid pressure responsive transmission servos for establishing different transmission drive ratios, a fluid pressure source, means for controlling the transmission drive ratio including a shift valve for controlling admission of actuation pressure to said servos, said shift valve being effective in a downshift position to establish a first transmission drive ratio and movable to an upshift position to establish a second transmission drive ratio, means for controlling the position of said shift valve including a vehicle speed responsive governor and a modulator valve connected to said source and adapted to deliver variable pressure to said shift valve, said governor delivering a variable pressure which increases with increase in vehicle speed to said shift valve and to said modulator valve, said governor pressure biasing said shift valve for movement from its downshift to its upshift position and biasing said modulator valve to decrease the pressure delivered by said modulator valve, said modulator valve being connected to said engine intake manifold for control by engine manifold vacuum and effective to deliver variable modulator pressure which increases with loss of available manifold vacuum and decreases with increase in vehicle speed, said modulator valve pressure being effective on said shift valve to bias said shift valve from its upshift toward its downshift position, an altitude compensator valve connected to said source and adapted to deliver variable pressure to said modulator valve, means for controlling said altitude compensator valve through a first range of movement to increase the compensator pressure in response to decrease of absolute atmospheric pressure including a spring and an expandable evacuated chamber opposing the action of said spring, said spring being effective upon loss of vacuum in said evacuated chamber to position said altitude compensator valve to reduce the pressure delivered by said altitude compensator valve to zero.

6. In a transmission control system for an engine driven vehicle of the type having an engine intake manifold and having fluid pressure responsive transmission servos for establishing the transmission drive ratio, a fluid pressure source, means for controlling the transmission drive ratio including a fluid pressure controlled shift valve connected to said source, means for positioning said shift valve in a downshift position including a fluid pressure responsive member, a modulator valve connected to said source for delivering variable pressure to said fluid pressure responsive member, a vehicle speed responsive governor supplied with fluid pressure from said source and effective to deliver variable pressure which increases with increase of vehicle speed to said shift valve and to said modulator valve, means responsive to governor pressure tending to move said shift valve to its upshift position, means responsive to governor pressure for decreasing the pressure delivered by said modulator valve in response to increase in vehicle speed, means yieldably biasing said modulator valve to increase the modulator pressure delivered by said modulator valve, means responsive to engine manifold vacuum for reducing the pressure delivered by said modulator valve, an altitude compensator valve connected to said source and adapted to deliver variable pressure to said modulator valve, means responsive to rise of pressure delivered by said altitude compensator valve to decrease said modulator valve delivered pressure, and means normally operable to increase the pressure delivered by said altitude compensator valve in response to decrease of absolute atmospheric pressure.

7. In a transmission control system for an engine driven vehicle of the type having an engine intake manifold and having fluid pressure responsive transmission servos for establishing the transmission drive ratio, a fluid pressure source, means for controlling the transmission drive ratio including a fluid pressure controlled shift valve connected to said source, means for positioning said shift valve in a downshift position including a fluid pressure responsive member, a modulator connected to said source for delivering variable pressure to said fluid pressure responsive member, a vehicle speed responsive governor supplied with fluid pressure from said source and effective to deliver variable pressure which increases with increase of vehicle speed to said shift valve and to said modulator valve, means responsive to governor pressure tending to move said shift valve to its upshift position, means responsive to governor pressure for decreasing the pressure delivered by said modulator valve in response to increase in vehicle speed, means yieldably biasing said modulator valve to increase the modulator pressure delivered by said valve, means responsive to engine manifold vacuum for reducing the pressure delivered by said modulator valve, an altitude compensator valve connected to said source and adapted to deliver variable pressure to said modulator valve, means responsive to rise of pressure delivered by said altitude compensator valve to decrease said modulator valve delivered pressure, spring means for biasing said altitude compensator valve towards a position to increase compensator valve delivered pressure, atmospheric pressure responsive means including an evacuated chamber normally opposing the action of said spring means, said spring means being effective to position said compensator valve to reduce the pressure delivered thereby to zero upon loss of vacuum in said evacuated chamber.

8. In a transmission control system for an engine driven vehicle of the type having an engine intake manifold, fluid pressure responsive servos for establishing different drive ratios, a fluid pressure source, a line pressure regulator valve connected to said source for controlling line pressure, a drive range selector valve connected to said line pressure regulator valve and adapted to be positioned to select a plurality of conditions of transmission operation including drive range, means including a shift valve movable from a downshift to an upshift position for controlling the transmission drive ratio, a modulator valve connected to said line pressure regulator valve and adapted to deliver variable modulator pressure to said line pressure regulator valve and to said shift valve, said modulator pressure biasing said line pressure regulator valve to increase said line pressure and biasing said shift valve towards its downshift position, means biasing said modulator valve to increase the modulator pressure delivered by said valve, vacuum responsive means operably connected to said intake manifold to decrease said modulator pressure in response to increase of available vacuum in said intake manifold, vehicle speed responsive means for biasing said shift valve towards its upshift position, an altitude compensator valve connected to said line pressure regulator valve and adapted to deliver variable compensator pressure to said shift valve, said compensator pressure being effective upon said modulator valve to decrease the modulator pressure in response to rise of compensator pressure, spring means normally biasing said compensator valve to increase the compensator pressure, evacuated means opposing the action of said spring means, said spring means being effective upon loss of vacuum in said evacuated means to position said compensator valve to reduce the compensator pressure to zero.

9. In a transmission control system for an engine driven vehicle of the type having an engine intake manifold, fluid pressure responsive servos for establishing different drive ratios, a fluid pressure source, a line pressure regulator valve connected to said source for controlling line pressure, means including a shift valve movable from a downshift to an upshift position for controlling the transmission drive ratio, a drive range selector valve connected to said line pressure regulator valve and adapted to be positioned to select a plurality of conditions of transmission operation, a vehicle speed responsive governor for delivering governor pressure which increases with increase of vehicle speed connected to said shift valve for biasing said shift valve towards its upshift position, a pressure regulator valve adapted to deliver a pressure less than line pressure, said drive range selector valve being effective in its drive range position to deliver line pressure to said governor and to said pressure regulator valve, a detent valve, a pressure regulator valve delivery passage for delivering pressure from said regulator valve to said detent valve, a second passage connecting said detent valve to said drive range selector valve and connected to exhaust when said drive range selector valve is positioned for drive range operation, a third passage connected to said detent valve and controlled by said detent valve, a chamber associated with said detent valve and normally connected to said fluid pressure source, means responsive to pressure in said chamber for positioning said detent valve to block off said pressure regulator valve delivery passage and to connect said third passage to said second passage, a manually controlled valve for connecting said chamber to exhaust, spring means for biasing said detent valve to connect said pressure reducer valve delivery passage to said third passage and to block off said second passage upon exhaust of pressure from said detent valve chamber, a modulator valve normally effective to deliver variable pressure to said line pressure regulator valve for controlling line pressure and to deliver variable pressure to said shift valve tending to move said shift valve to its downshift position, said third passage from said detent valve being connected to said modulator valve, vacuum responsive means connected to said engine intake manifold normally effective to reduce the modulator pressure delivered by said modulator valve in response to increase in available engine manifold vacuum, said modulator valve being effective to deliver pressure from said regulator valve to said line pressure regulator valve and to said shift valve when said regulator valve delivery passage is connected to said third passage by said detent valve.

10. In a transmission control system for an engine driven vehicle of the type having an engine intake manifold and having fluid pressure responsive servos for establishing different transmission drive ratios, a fluid pressure source, means for controlling the transmission drive ratio including a fluid pressure controlled shift valve connected to said source and movable from a downshift to an upshift position to change the transmission drive ratio, a drive range selector valve connected to said source and adapted to be positioned to select drive range, low range and reverse conditions of operation, a modulator valve connected to said source and adapted to deliver variable pressure to said shift valve for biasing said shift valve towards its downshift position, a vehicle speed responsive governor adapted to deliver variable pressure which increases with increase of vehicle speed to said shift valve and to said modulator valve, said governor pressure being effective on said shift valve to bias said shift valve towards its upshift position and effective upon said modulator valve to decrease the pressure delivered by said modulator valve, a downshift detent valve, a pressure regulator valve, a first drive range pressure supply passage controlled by said drive range selector valve effective in said drive range and low range positions of said drive range selector valve to deliver line pressure to one of said servos, to said governor, to said shift valve, and to said pressure regulator valve, said drive range selector valve being effective in said reverse position to connect said last-mentioned passage to exhaust, a second drive range pressure supply passage controlled by said drive range selector valve for delivering line pressure from said drive range selector valve to said pressure regulator valve and to said detent valve when said drive range selector valve is positioned to select low range operation, said last-mentioned passage being connected to exhaust upon movement of said drive range selector valve to said drive range position, a pressure regulator valve delivery passage for delivering controlled pressure from said regulator valve to said detent valve, a detent valve delivery passage for delivering pressure from said detent valve to said shift valve and to said modulator valve, means normally biasing said detent valve to block off said detent valve delivery passage from said pressure regulator valve delivery passage and to connect said detent valve delivery passage to said second drive range pressure supply passage, means for controlling the position of said detent valve including manually controlled means for permitting said detent valve to move to a position to block off said second drive range pressure supply passage and to connect said pressure regulator valve delivery passage to said detent valve delivery passage, said modulator valve being normally effective to deliver variable pressure to said shift valve when said detent valve delivery passage is connected to exhaust and effective to deliver regulator valve pressure to said shift valve when said detent valve is effective to deliver regulator valve pressure to said detent valve delivery passage.

11. In a transmission control system for an engine driven vehicle of the type having an engine intake manifold and having fluid pressure responsive servos for establishing the transmission drive ratio, a fluid pressure source, a line pressure regulator valve, means for controlling the transmission drive ratio including a shift valve supplied with fluid from said line pressure regulator valve and movable from a downshift to an upshift position, a modulator valve supplied with fluid from said line pressure regulator valve and adapted to normally deliver variable modulator pressure to said line pressure regulator valve and to said shift valve, means biasing said modulator valve to increase the modulator pressure delivered by said valve, vacuum responsive means connected to said manifold for decreasing the modulator pressure in response to increase of available engine vacuum, said modulator valve pressure being effective on said shift valve to bias said shift valve towards its downshift position and effective upon said line pressure regulator valve to bias said line pressure regulator valve to increase the line pressure, an altitude compensator valve supplied with line pressure from said line pressure regulator valve and adapted to deliver variable compensator pressure to said modulator valve, means biasing said compensator valve to increase said compensator pressure, an evacuated bellows opposing the action of said biasing means, said biasing means being effective upon loss of vacuum in said bellows to reduce said compensator pressure to zero, said compensator pressure being normally effective upon said modulator valve to reduce the modulator pressure in response to rise of compensator pressure, a speed responsive governor supplied with line pressure from said line pressure regulator valve and effective to deliver governor pressure to said shift valve and to said modulator valve, said governor pressure being effective to bias said shift valve towards its upshift position and to bias said modulator valve to decrease the modulator pressure delivered by said modulator valve, an additional pressure regulator valve supplied with pressure from said line pressure regulator valve and adapted to deliver regulated pressure less than line pressure to a detent valve, a detent valve delivery passage connected to said modulator valve, an exhaust passage connected to said detent valve, means normally biasing said detent valve to connect said detent pressure delivery passage to said exhaust passage, and manually controlled means for permitting said detent valve to block off said exhaust passage and to connect said additional regulator valve to said detent valve delivery passage to permit regulated pressure from said additional pressure regulator valve to be delivered to said line pressure regulator valve to boost the line pressure delivered by said valve and to deliver said regulated pressure to said shift valve for downshifting said shift valve, said regulated pressure being delivered to said line pressure regulator valve through said modulator valve delivery passage.

References Cited by the Examiner
UNITED STATES PATENTS

| | | | |
|---|---|---|---|
| 3,020,776 | 2/1962 | May et al. | 74—472 |
| 3,077,122 | 2/1963 | Olsen | 74—472 |
| 3,106,104 | 10/1963 | Harry | 74—472 |
| 3,159,051 | 12/1964 | Herndon et al. | 74—472 |

DAVID J. WILLIAMOWSKY, *Primary Examiner.*

J. R. BENEFIEL, *Assistant Examiner.*